United States Patent
Copple, Sr.

(10) Patent No.: US 11,767,247 B1
(45) Date of Patent: Sep. 26, 2023

(54) WASTE SOLIDIFICATION COMPOSITIONS, IN-SITU USE OF THE SAME AND METHODS OF REPURPOSING CALCIUM-CONTAINING INDUSTRIAL BY-PRODUCTS

(71) Applicant: Northgate Processing, LLC., New Castle, PA (US)

(72) Inventor: Patrick J. Copple, Sr., New Castle, PA (US)

(73) Assignee: NORTHGATE PROCESSING, LLC, New Castle, PA (US)

( * ) Notice: Subject to any disclaimer, the term of this patent is extended or adjusted under 35 U.S.C. 154(b) by 335 days.

(21) Appl. No.: 17/032,570

(22) Filed: Sep. 25, 2020

Related U.S. Application Data

(60) Provisional application No. 62/905,586, filed on Sep. 25, 2019.

(51) Int. Cl.
| | |
|---|---|
| C02F 11/00 | (2006.01) |
| C02F 11/148 | (2019.01) |
| E21B 21/06 | (2006.01) |
| C09K 3/32 | (2006.01) |
| C02F 103/36 | (2006.01) |

(52) U.S. Cl.
CPC .......... C02F 11/008 (2013.01); C02F 11/148 (2019.01); C09K 3/32 (2013.01); E21B 21/06 (2013.01); *C02F 2103/365* (2013.01)

(58) Field of Classification Search
CPC ....... C02F 11/00; C02F 11/008; C02F 11/148; C02F 2103/365; C09K 3/32; E21B 21/06
USPC .......................................................... 502/400
See application file for complete search history.

(56) References Cited

U.S. PATENT DOCUMENTS

| | | | |
|---|---|---|---|
| 4,063,386 A | 12/1977 | Tramier | |
| 4,913,585 A | 4/1990 | Thompson et al. | |
| 8,926,220 B2 | 1/2015 | Iman et al. | |
| 2011/0301399 A1* | 12/2011 | Perlman | C02F 11/008 588/2 |

FOREIGN PATENT DOCUMENTS

| | | | | |
|---|---|---|---|---|
| WO | WO-2006040135 A1 * | 4/2006 | ............ | C02F 11/008 |

* cited by examiner

*Primary Examiner* — Edward M Johnson
(74) *Attorney, Agent, or Firm* — Blynn L. Shideler; Krisanne Shideler; BLK Law Group

(57) ABSTRACT

Waste solidification compositions and methods of using them repurpose calcium-containing industrial by-products. The compositions comprise either 1) a) auto shred residue; and b) a particulate wood-based product, or 2) a) a solid, particulate calcium-containing compound; and b) a superabsorbent material. The method of repurposing a solid, particulate calcium-containing industrial by-product comprises a) blending the by-product with a superabsorbent material to form a waste solidification composition; b) adding the waste solidification composition to a liquid industrial waste stream; and c) allowing the waste solidification composition to absorb at least 1 times its weight of the liquid industrial waste stream to form a solid waste product. The solid waste product passes Paint Filter Liquids Test Method 9095B.

18 Claims, 1 Drawing Sheet

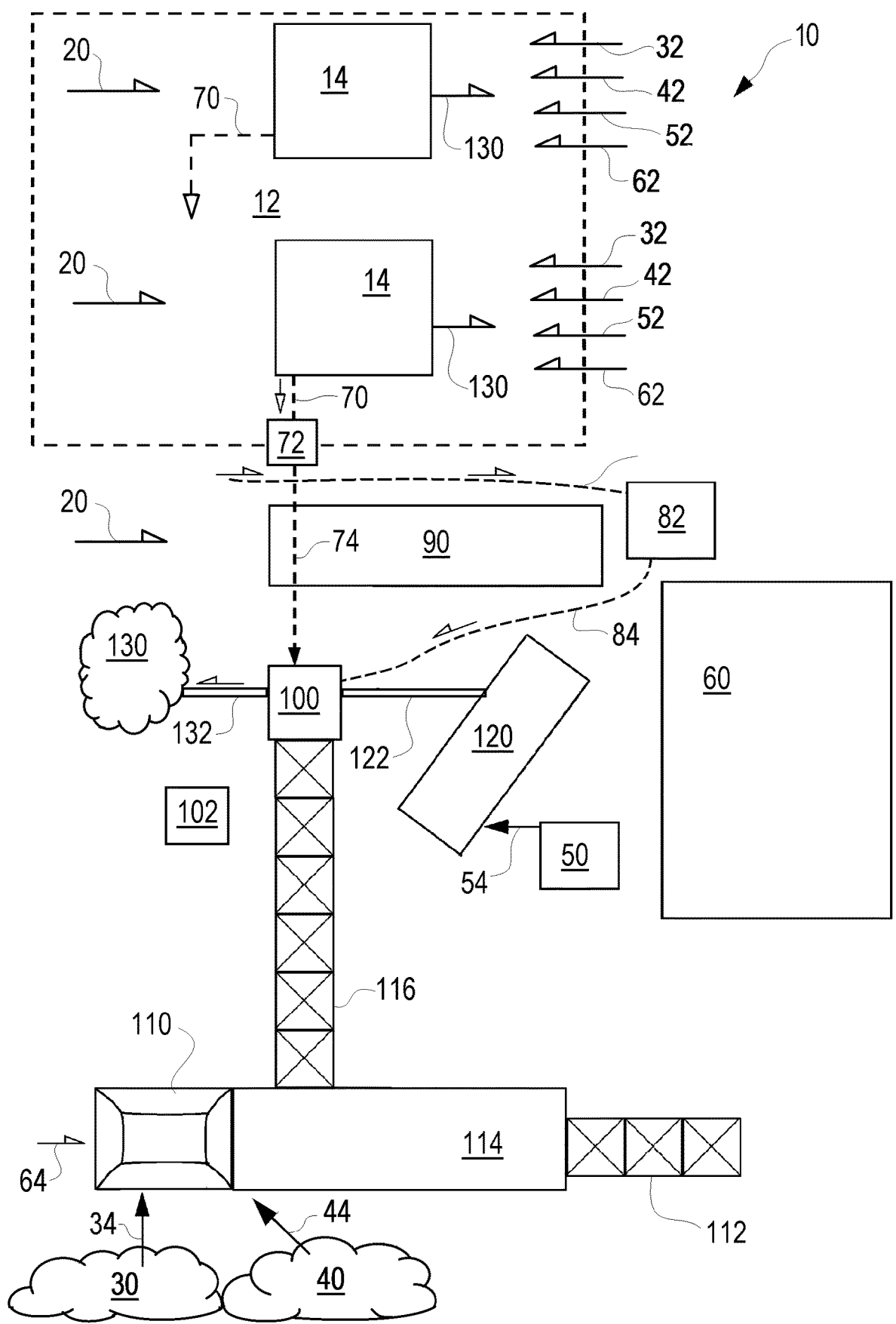

WASTE SOLIDIFICATION COMPOSITIONS, IN-SITU USE OF THE SAME AND METHODS OF REPURPOSING CALCIUM-CONTAINING INDUSTRIAL BY-PRODUCTS

RELATED APPLICATION

The present application claims the benefit of U.S. Patent Application Ser. No. 62/905,586 filed Sep. 25, 2019 titled "Waste Solidification Compositions and Methods of Repurposing Calcium-Containing Industrial By-Products" which is incorporated herein by reference.

FIELD OF THE INVENTION

The present invention relates to waste solidification compositions and methods of using them by repurposing calcium-containing industrial by-products.

BACKGROUND OF THE INVENTION

Current USEPA regulations require that industrial waste products for disposal into landfills must be substantially solid and pass a paint filter liquid test. The paint filter liquid test, when performed on a sample of a given waste material, is used to determine whether the subject waste material is free of any free (i. e., non-absorbed or non-bound) liquids and therefore acceptable for disposal in a landfill.

U.S. Pat. No. 4,063,386 teaches a method for restoring drilling mud pits comprising covering the floc in a mud pit with a drying material capable of absorbing water from the floc and then covering the material with earth. The absorbent material is a natural cellulosic material that may be saw dust, wood chips, peat, cork, straw, corncobs, leaves, or paper waste materials. The absorbent material may alternatively be chips of polyurethane, polystyrene, polyethylene, or polypropylene foam. The quantity of absorbent material used is such that it can absorb all of the water from the floc of the mud pit.

U.S. Pat. No. 4,913,585 teaches treating a waste drilling mud by flocculating, aggregating, agglomerating and dewatering the waste drilling mud and separating out free water. The process stabilizes the waste drilling mud for underground burial. The thickened, dewatered drilling mud solids may be further treated with a water absorbing binder to produce a residue which has sufficient bearing strength to support an earthen overburden and may be disposed of by burial. The water absorbing binder may be natural gums (e.g., carboxymethylcellulose, guar, hydroxyethylcellulose, carrageenan, alginates, and low to moderate molecular weight polyacrylamide polymers). Polyacrylamide emulsion may additionally be added to separated sludge having a solids content of approximately 20-35% by volume. The combined sludge and polyacrylamide emulsion are mixed, and bagged and sealed in plastic bags for transport to a landfill. A separated drilling mud waste sludge may be further treated by applying a water permeable layer such as sand, over the top of the separated waste sludge, and that a polyacrylamide absorbent binder layer is placed above the sand layer, and that about four feet of an earth overburden may be placed on top of the polyacrylamide absorbent binder layer. The overlying earthen overburden, water absorbent polyacrylamide layer, and sand compress the sludge so that a portion of the remaining moisture content is squeezed out of the sludge and percolates up through the sand layer and into the water absorbent binder layer (acrylamide layer). The water absorbent binder (acrylamide layer) remains separated from the waste drilling mud solids. Under the current environmental landfill regulations, waste sludge treated according to the teachings of U.S. Pat. No. 4,913,585 would likely fail the paint filter liquids test.

U.S. Pat. No. 8,926,220 is drawn to a process for thickening drilling mud waste materials including the steps of mixing a drilling mud waste materials having greater than zero percent by weight free liquid with an effective amount of one or more anionic copolymers to form a treated drilling mud. The anionic copolymer is derived from either (a) an anionic monomer, a nonionic monomer, and a cross-linking monomer, resulting in a cross-linked anionic copolymer; or (b) a non-cross-linked, linear chain co-polymer of an anionic polymer and a nonionic polymer; or (c) a blend of the combination of (a) and (b). A modified drilling mud waste material is disclosed having zero percent by weight free liquid.

It would be desirable to provide waste solidification compositions that can be used to treat a variety of liquid industrial waste streams in addition to drilling waste from oil or gas drilling operations, rendering them suitable for landfill disposal by passing the paint filter liquids test. It would further be desirable to prepare such waste solidification compositions by repurposing calcium-containing industrial by-products, having cementitious properties.

BRIEF DESCRIPTION OF THE DRAWING

The FIGURE is a schematic drawing showing the in-situ preparation and use of the waste solidification compositions according to the present invention in a landfill application.

SUMMARY OF THE INVENTION

The present invention is directed to waste solidification compositions and methods of using them by repurposing calcium-containing industrial by-products. The compositions comprise either 1) a) auto shred residue; and b) a particulate wood-based product, or 2) a) a solid, particulate constituent comprising pozzolanic material and/or a calcium-containing compound; and b) a superabsorbent material.

The present invention is also drawn to a method of repurposing a solid, particulate calcium-containing industrial by-product, comprising a) blending the by-product with a superabsorbent material to form a waste solidification composition; b) adding the waste solidification composition to a liquid industrial waste stream; and c) allowing the waste solidification composition to absorb at least 1 times its weight of the liquid industrial waste stream to form a solid waste product. The solid waste product passes Paint Filter Liquids Test Method 9095B.

These and other advantages of the present invention will be clarified in the description of the preferred embodiments.

DESCRIPTION OF THE PREFERRED EMBODIMENTS OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

A waste solidification composition according to the present invention may comprise a) auto shred residue; and b) a particulate wood-based product. Auto shred residue, also known as "auto fluff", comprises shredded waste from vehicular interiors. It is typically a mixture of non-ferrous materials including plastics, foam, textiles, rubber and glass. For the purposes of the present invention, it is often filtered, or screened, so that the auto shred residue used in the composition has an average particle size of 4 inches or less. Larger residue sizes may not provide sufficient surface area for adequate absorption of liquid from waste streams to be treated.

The waste solidification composition of the present invention further comprises b) a particulate wood-based product. Examples of suitable products (PWPs) include sawdust, paper pulp, and/or ground particle board. Sawdust is often used. The volume ratio of the auto shred residue a) to particulate wood-based product b) is typically 60 to 85:15 to 40, such as 60 to 70:30 to 40.

In certain examples of the present invention, the composition further comprises a superabsorbent material. By "superabsorbent" is meant a material that can absorb and retain extremely large amounts of a liquid relative to its own mass. For example, a superabsorbent polymer (SAP) may absorb 300 times its weight (from 30 to 60 times its own volume) of deionized or distilled water and form a solid mass that is up to 99.9% liquid. Suitable superabsorbent materials include, for example, polyacrylamide, cellulose, corn cob fractions, sodium polyacrylates, ethylene maleic anhydride copolymers, cross-linked carboxymethylcellulose, polyvinyl alcohol copolymers, cross-linked polyethylene oxide, and/or starch grafted copolymers of polyacrylonitrile. Starch-grafted polyacrylonitriles have been known to demonstrate water absorption greater than 400 times their weight. Suitable superabsorbent materials are commercially available and may be prepared by conventional polymerization techniques including gel polymerization, solution polymerization, and suspension polymerization.

When the superabsorbent material is used, the superabsorbent material is typically present in the composition in an amount of at least 0.5 percent by weight, such as at least 1 percent by weight, such as at least 2 percent by weight, or at least 4 percent by weight, based on the total weight of the composition; and up to 10 percent by weight, or up to 5 percent by weight, based on the total weight of the composition. It has been found that the addition of a superabsorbent material allows for a significant reduction in the volume of wood-based product necessary; for example, the volume of saw dust in the composition may be reduced by up to half while still providing a composition that is effective for treating a liquid industrial waste stream to yield a waste product that is acceptable for disposal in a landfill. By "acceptable for disposal in a landfill" is meant that a sample of the waste product passes the Paint Filter Liquids Test Method 9095B as described below. In such cases the volume ratio of the auto shred residue a) to particulate wood-based product b) may be 80 to 85:15 to 20. The use of a superabsorbent material in the composition also helps to mitigate the release of airborne particulates during the preparation and use of the composition of the present invention.

The waste solidification compositions of the present invention may alternatively comprise a) a solid, particulate constituent comprising pozzolanic material and/or a calcium-containing compound; and b) a superabsorbent material such as any of those described above, present in the composition in amounts as described above. Specifically, the superabsorbent material is typically present in the composition in an amount of at least 0.5 percent by weight, such as at least 1 percent by weight, such as at least 2 percent by weight, or at least 4 percent by weight, based on the total weight of the composition; and up to 10 percent by weight, or up to 5 percent by weight, based on the total weight of the composition.

Pozzolanic materials may be anything that have cementitious properties, and typically comprise siliceous materials or blends of siliceous and aluminum containing material. Pozzolanic material generally reacts with slaked lime at ambient temperature in the presence of moisture. One source of suitable pozzolanic material may be slag, a steel processing waste stream. Slag is the glass-like by-product left over after a desired metal has been separated (i.e., smelted) from its raw ore. Slag is usually a mixture of metal oxides and silicon dioxide.

Suitable calcium-containing compounds include cement, lime sand, and/or hydrated lime. The calcium-containing compounds may additionally or alternatively comprise a calcium-containing industrial by-product, such as a co-product, or waste product. Examples include cement kiln dust, lime kiln dust, hydrated lime processing tailings, fly ash, and/or bottom ash. This allows for a beneficial reuse, or repurposing of such by-products as described below.

The average particle size of the particulate constituent a) is typically less than 1 cm. Where the calcium-containing compound forms the entire particulate constituent the calcium-containing compound is typically present in the composition of the present invention in an amount that allows for a calcium content in the composition of 250,000 to 400,000 mg Ca/kg, usually around 300,000 mg Ca/kg composition. Where the pozzolanic material forms the entire particulate constituent the pozzolanic material is typically present in the composition of the present invention in an amount that allows for a silicon dioxide content in the composition of 250,000 to 400,000 mg $SiO_2$/kg, usually around 300,000 mg $SiO_2$/kg composition. Where the particulate constituent is formed of a mixture of pozzolanic material and calcium-containing compound the particulate constituent is typically present in the composition of the present invention in an amount that allows for a silicon dioxide calcium containing compound and reaction products thereof content (represented as {Ca+SiO2}) in the composition of 250,000 to 400,000 mg {Ca+SiO2}/kg, usually around 300,000 mg {Ca+SiO2}/kg composition.

The waste solidification compositions of the present invention that comprise a solid, particulate constituent and a superabsorbent material may further comprise a particulate wood-based product and/or auto shred residue collectively referenced in this embodiment as an extender. The volumetric ratio of the combined solid, particulate constituent and the superabsorbent material to the extender is 10-90:90-10. The particular optimization of this ratio is determined by minimizing cost while still providing a composition that is effective for treating a given liquid industrial waste stream to yield a waste product that is acceptable for disposal in a landfill. Where the extender is a mix of particulate wood-based product and auto shred residue, the volume ratio of the auto shred residue to particulate wood-based product may be 80 to 85:15 to 20.

The waste solidification compositions of the present invention may be pre-mixed and stored for use as solidification agents. Mixing augers or extruders, mixing tanks, pug mills, mix pits or the like may be used for pre-mixing any of the above described compositions of the present invention with the mixing used to provide a generally homogeneous composition. Alternatively the waste solidification compositions may be formed in-situ by having the constituents of the composition mixed directly with the waste stream.

The FIGURE is a schematic drawing showing the in-situ preparation and use of the waste solidification compositions according to the present invention in a landfill 10 application. The in-situ preparation of the compositions of the present invention means that the compositions are formed at the same time they are mixed with the waste stream to be solidified.

The general structure and nature of landfills 10 are known in the art and typically can include a concrete pad 12 with one or more mix pits 14. Any of the waste solidification compositions of the present invention may be prepared by mixing the components together in pit 14 or tank together with a waste stream 20. The size of the tank or pit 14 may be at least ten cubic yards; smaller or larger batches may be prepared depending on the volume of the liquid waste stream 20 to be treated. The waste solidification compositions of the present invention may be used to treat liquid industrial waste streams 20 to render them acceptable for disposal in a landfill 10.

When using the mix pits 14 the waste stream 20 is delivered to the selected pit 14 together with the components of waste solidification composition of the present invention in the amounts discussed above. The landfill 10 includes a source of auto shred residue 30 that can be supplied at 32 to the pits 14, a supply of particulate wood-based product 40 that can be supplied at 42 to the pits 14, a supply of Sap that can be supplied at 52 to the pits 14, and a supply of solid, particulate constituent 60 comprising pozzolanic material and/or a calcium-containing compound that can be supplied at 62 to the pits 14. The waste stream 20 and the components of the waste solidification composition are mixed in the pits 14 to form a solidified final product 130 with the mixing by conventional equipment. The final product 130 can be removed and transported to a disposal area of the landfill 10.

In an alternative application at the landfill 10 the waste stream 20 can be fed to a hopper 90 leading to a mixing pugmill 100. A separate hopper 110 can receive the auto shred residue 30 via a feed path 34, particulate wood-based product 40 via a feed path 44, and particulate constituent 60 via a feed path 34. The hopper 110 leads to screen 114 then to conveyor 116 to the pugmill 100. The screen 114 allows for the removal of oversized particles in these constituents. The feed streams or paths 34, 44, and/or 64 could also lead to conveyor 112 then to the screen 114. The supply of SAP 50 can be fed via stream 54 to hopper 120 then via conveyor 122 to the pugmill 100. The pugmill 100 is controlled by controller 102 and the components of waste solidification composition of the present invention in the amounts discussed above which will be mixed or blended with the waste stream 20 in the pugmill forming the finished product 130 that exits the pugmill 100 via conveyor 132.

The pugmill 100 also includes the ability to receive and treat liquid or leachate from the mixing pits at 70 via pump 72 and input 74. The pugmill also includes the ability to receive and treat landfill leachate 82 via a typical gravity feed 80 and delivered to the pug mill via tube or path 84. The waste stream being treated includes the delivered waste stream 20, the landfill leachate, the mixing pit leachate and various mixtures thereof.

The present invention is further drawn to a method of repurposing a solid, particulate calcium-containing industrial by-product such as any of those described above, the method comprising:
  a) blending the by-product with a superabsorbent material to form a waste solidification composition as discussed above;
  b) adding the waste solidification composition to a liquid industrial waste stream; and
  c) allowing the waste solidification composition to absorb at least 1 times its weight of the liquid industrial waste stream to form a solid waste product, wherein the solid waste product passes Paint Filter Liquids Test Method 9095B. Liquid industrial waste streams that may be treated by the method of the present invention include any that contain free liquid. Particular examples include drilling waste from oil or gas drilling operations (such as drilling muds, spent and used solvents, paint and paint wastes, pipe doping materials, sand and scale, paraffin, and hydraulic fluids), off-specification industrial products (such as paints, fuels, solvents, cleaners, etc.), or aqueous industrial effluent (waste rinse waters, wash waters, detergents, etc.). As noted in the FIGURE the step of blending the by-product with a superabsorbent material to form a waste solidification composition may be simultaneous with the adding the waste solidification composition to a liquid industrial waste stream, called in-situ formation herein.

Upon addition of the waste solidification composition to the waste stream, the composition absorbs free liquid from the waste stream. The composition typically absorbs at least 1 times its weight of the liquid waste stream, often at least 1.2 times its weight, or at least 1.5 times its weight, and even at least 2 times its weight. A solid waste product is formed that passes Paint Filter Liquids Test Method 9095B. This method is used to determine the presence of free liquids in a representative sample of waste and used to determine compliance with 40 CFR 264.314 and 265.314. A 100 mL or 100 g representative sample is placed in a paint filter. If any portion of the material passes through and drops from the filter within the 5-min test period, the material is deemed to contain free liquids (failure). If any portion contains free liquids then the entire samples is considered to have free liquids. The test must be performed above the freezing point of any liquid in the sample and can, but is not required to, exceed room temperature of 25° C.

An analogous process can be used for repurposing a solid, particulate pozzolanic material industrial by-product, such as slag, and combinations of a solid, particulate pozzolanic material industrial by-product and a solid, particulate calcium-containing industrial by-product.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A waste solidification composition comprising:
   a) auto shred residue comprising a mixture of non-ferrous materials, which mixture is screened whereby the auto shred residue has an average particle size of less than 4 inches; and
   b) a particulate wood-based product, wherein the volume ratio of the auto shred residue a) to particulate wood-based product b) is 60 to 85:15 to 40.

2. The composition of claim 1 wherein the auto shred residue and the particulate wood-based product is at least 90% by weight of the waste solidification composition.

3. The composition of claim 1 wherein the particulate wood-based product comprises sawdust, paper pulp, and/or ground particle board.

4. The composition of claim 1, further comprising a superabsorbent material.

5. The composition of claim 4 wherein the superabsorbent material comprises polyacrylamide, cellulose, corn cob fractions, sodium polyacrylates, ethylene maleic anhydride copolymer, cross-linked carboxymethylcellulose, a polyvinyl alcohol copolymer, cross-linked polyethylene oxide, and/or a starch grafted copolymer of polyacrylonitrile.

6. The composition of claim 4 wherein the superabsorbent material is present in the composition in an amount of 1 to 10 percent by weight, based on the total weight of the composition.

7. The composition of claim 1 wherein the volume ratio of the auto shred residue a) to particulate wood-based product b) is 80 to 85:15 to 20.

8. The composition of claim 1 wherein the auto shred residue and the particulate wood-based product is at least 95% by weight of the waste solidification composition.

9. The composition of claim 1 wherein the auto shred residue and the particulate wood-based product is 100% by weight of the waste solidification composition.

10. A waste solidification composition for solidifying an aqueous industrial effluent comprising:
    a) auto shred residue comprising a mixture of non-ferrous materials, which mixture is screened whereby the auto shred residue has an average particle size of less than 4 inches; and
    b) a particulate wood-based product, wherein the volume ratio of the auto shred residue a) to particulate wood-based product b) is 60 to 85:15 to 40; and wherein the auto shred residue and the particulate wood-based product is at least 90% by weight of the waste solidification composition and wherein the composition is configured to treat an aqueous industrial effluent to yield a waste product which passes the Paint Filter Liquids Test Method 9095B.

11. The composition of claim 10 wherein the auto shred residue is from vehicle interiors including plastics, foam, textiles, rubber and glass.

12. The composition of claim 10 wherein the particulate wood-based product comprises sawdust, paper pulp, and/or ground particle board.

13. The composition of claim 10, further comprising a superabsorbent material.

14. The composition of claim 13 wherein the superabsorbent material comprises polyacrylamide, cellulose, corn cob fractions, sodium polyacrylates, ethylene maleic anhydride copolymer, cross-linked carboxymethylcellulose, a polyvinyl alcohol copolymer, cross-linked polyethylene oxide, and/or a starch grafted copolymer of polyacrylonitrile.

15. The composition of claim 13 wherein the superabsorbent material is present in the composition in an amount of 1 to 10 percent by weight, based on the total weight of the composition.

16. The composition of claim 10 wherein the volume ratio of the auto shred residue a) to particulate wood-based product b) is 80 to 85:15 to 20.

17. The composition of claim 10 wherein the auto shred residue and the particulate wood-based product is at least 95% by weight of the waste solidification composition.

18. The composition of claim 10 wherein the auto shred residue and the particulate wood-based product is 100% by weight of the waste solidification composition.

* * * * *